(12) United States Patent
Howerton et al.

(10) Patent No.: US 6,862,387 B2
(45) Date of Patent: Mar. 1, 2005

(54) LOW-LOSS COMPACT REFLECTIVE TURNS IN OPTICAL WAVEGUIDES

(75) Inventors: Marta M. Howerton, Fairfax Station, VA (US); Roger Krahenbuhl, Huber+Suhner AG (CH); Robert P. Moeller, Fort Washington, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 332 days.

(21) Appl. No.: 10/165,940

(22) Filed: Jun. 11, 2002

(65) Prior Publication Data

US 2003/0228107 A1 Dec. 11, 2003

(51) Int. Cl.[7] .............................. G02B 6/42; G02B 6/26
(52) U.S. Cl. .......................................... 385/47; 385/20
(58) Field of Search ............................. 385/18, 17, 20, 385/16, 36, 33, 129, 130, 47; 359/223; 349/113, 62, 63

(56) References Cited

U.S. PATENT DOCUMENTS

| | | | |
|---|---|---|---|
| 5,097,479 A | | 3/1992 | Opower |
| 5,537,500 A | * | 7/1996 | Yokoyama .................... 385/31 |
| 5,757,990 A | | 5/1998 | Miyakawa |
| 5,936,993 A | | 8/1999 | Opower |
| 6,243,516 B1 | | 6/2001 | Seino |
| 6,259,841 B1 | * | 7/2001 | Bhagavatula ................. 385/47 |
| 6,504,968 B1 | * | 1/2003 | Zhu et al. ..................... 385/18 |
| 6,640,023 B2 | * | 10/2003 | Miller et al. .................. 385/17 |
| 6,690,849 B1 | * | 2/2004 | Dadap et al. ................. 385/18 |
| 6,693,690 B2 | * | 2/2004 | Umemoto et al. .......... 349/113 |
| 2003/0053745 A1 | * | 3/2003 | Chen ............................ 385/20 |
| 2003/0059153 A1 | * | 3/2003 | Miller et al. .................. 385/17 |
| 2004/0091202 A1 | * | 5/2004 | Ji et al. ........................ 385/18 |

OTHER PUBLICATIONS

Nakazawa TI: LiNbO3 Acousto–Optic Tunable Filter (AOTF) Fujitsu Sci. Tech. J. (Jul. 1999) pp. 107–112.
Howerton et al, Fully Packeged, Broad–Band LiNbO3 Modulator With Low Drive Voltage, vol. 12, No. 7, Jul. 2000, IEEE Photonics Technology Letters, pp. 792–794.
Betts et al, Reflective Linearized Modulator, IThC1–1–IThC1–4, pp. 626–629.
Voges et al, True Time Delay Integrated Optical RF Phase Shifters In Lithium Bate, Nov. 6, 1997, vol. 33, No. 23, Electronics Letters, pp. 1950–1951.

* cited by examiner

Primary Examiner—Thien M. Le
(74) Attorney, Agent, or Firm—John J. Karasek; Suresh Koshy; George Kap

(57) ABSTRACT

This invention pertains to a device and method for making same. The device includes a substrate suitable for supporting pathways for optical signals; separate pathways disposed on the substrate suitable for propagating optical signals, the pathways including an input and an output optical pathway; and a reflective surface in operative contact with the input and output pathways for receiving an optical signal from the input pathway and reflecting the optical signal into the output pathway. The method for making the device includes the steps of providing two separate optical pathways on a single substrate, one being an input pathway and the other being an output pathway; providing a reflective surface in operative contact with the pathways whereby an input optical signal is passed through the input pathway, reflected by the reflective surface into the output pathway, and passed out of the output pathway, whereby the device can be made on a lithium niobate substrate with titanium-diffused pathways with a loss of about 1.0 dB or less, in a space that is at least ⅕ the space required by the same or similar prior art device.

30 Claims, 8 Drawing Sheets

LOW-LOSS COMPACT REFLECTIVE TURNS IN OPTICAL WAVEGUIDES

BACKGROUND OF THE INVENTION

1. Field of the Invention

This invention pertains to electrooptical and optical devices containing low-loss compact reflective turns and to methods for making and operating such devices.

2. Description of Related Art

Electrooptic and optical devices characterized by the presence of waveguides, particularly in lithium niobate (LiNbO$_3$), are commercially available. Electrooptic devices, such as optical modulators, have the ability to change a particular characteristic of an optical signal, such as its intensity, phase, or polarization. Electrooptic modulators, particularly LiNbO$_3$ modulators, have application in radio frequency analog links, digital communications and electric field sensing.

The most common technique for forming waveguides in LiNbO$_3$ substrates is by high temperature indiffusion of a titanium film which has been photolithographically defined. This technique produces high quality optical waveguides with very low propagation losses of less than 0.2 dB/cm in straight channels. The low propagation losses result, in part, from the fact that the LiNbO$_3$ lattice is only minimally perturbed by titanium. This technique of forming waveguides produces only a small increase in refractive index, i.e., Δn of about 0.005 to 0.02, compared to that of bulk LiNbO$_3$, which leads to a relatively weakly confined waveguide mode. While this confinement is not a problem in straight waveguides, it is a severe limitation for bent or curved waveguides.

Researchers have addressed the issue of waveguide bends from a theoretical standpoint dealing with waveguides in general, to a more empirical standpoint of dealing specifically with LiNbO$_3$ waveguides. The optical loss or attenuation α in waveguides is a complicated function which depends on many parameters. In particular, a large radius of curvature R and a high degree of mode confinement related to a large Δn are critical factors in achieving low bend losses in curved waveguides, especially because loss depends exponentially on these two parameters. If one uses a conventional process for forming Ti:LiNbO$_3$ waveguides, the value of Δn cannot be changed much. Thus, a low-loss bend in LiNbO$_3$ must have a very large bend radius. A 180° semicircular turn requires a great deal of "real estate" on the wafer and is not always practical.

An example of a practical LiNbO$_3$ electrooptic device with several LiNbO$_3$ semicircular bends is one where several nested semicircular bends are used in a radio frequency phase shifter. The turns had a 1.2 cm minimum bending radius which produced an excess loss of less than 1 dB loss per turn. A different type of LiNbO$_3$ electrooptic device was one where elements of a large switching matrix were interconnected by bent waveguides. In this case, the bending angle was around 3.5°, so only a small fraction of a semicircle was used. Losses of 0.9 dB/cm were achieved for a 4 cm bending radius when the waveguide was widened to increase confinement. Since only short pathlengths were used for the interconnects, the loss may have been acceptable in this application. However, it translates into a huge total loss of 11 dB for a complete semicircle with a 4 cm radius.

The need to form compact bends in an electrooptic and/or optical device is fundamentally related to the limited amount of space on the wafer. Three-inch and four-inch diameter LiNbO$_3$ wafers are available from commercial sources, although larger sizes of optical quality LiNbO$_3$ are not readily available. The photomask pattern is typically generated in a square which, due to practical considerations, is at most 6 cm along an edge for a three-inch wafer (that is, 6 cm is the maximum usable length) and 8 cm along an edge for a four-inch wafer. Given that the size and usable portion of LiNbO$_3$ wafers is limited, it is therefore highly desirable to conserve space on the wafers. This permits a greater density of devices and can improve functionality. To achieve these goals, several different approaches are discussed herein for forming low-loss compact LiNbO$_3$ turns or turns of any magnitude. These turns can be incorporated into modulators or any other electrooptic and/or optical device to increase interaction or active length and lower drive voltage, or they can be used to interconnect separate optical devices.

The first embodiment of this invention is a modification the conventional s-bend structure shown in FIG. 2 which is often used to form low-loss transitions in LiNbO$_3$ that require small lateral displacements. As shown in FIG. 2, the s-bend waveguide 16 for single-mode signal operation includes a lower section 18 and spaced thereabove at a higher elevation is upper section 20 separated by strongly angled bend section 22. Bend section 22 connects the lower and upper sections 18,20 and is disposed at an angle from the horizontal on the x-axis, where the angle changes continuously along the s-bend waveguide 16, reaching a maximum angle θ at the mid-point of the s-bend. The vertical distance along the y-axis between the lower and upper channel sections 18,20 is h, measured from the center of the lower waveguide section 18 to the center of the upper waveguide section 20. Input light or optical input 24 is injected into the lower waveguide section, travels through waveguide 16 and exits the waveguide at 26. The distance L/2, where L is length, extends from the midpoint of the bend section 22 to the terminal portion of upper waveguide section 20 or from the end of lower waveguide section 18 to the midpoint of bend section 22.

The form of the s-bend is given by the equation (1) as y=(hx/L)−(h/2π)sin(2πx/L), where x and y represent the horizontal and vertical coordinates of a 2-dimensional figure relative to the center of input lower section 18, h is the height and L is the length. The maximum angle θ is given by equation (2) as θ=tan$^{-1}$(2h/L). It has been previously shown that the excess loss in an s-bend, relative to a straight channel, is a strong function of the parameter L$^2$/h, and that if L$^2$/h is above a certain threshold, the excess loss accumulated in the s-bend waveguide 16 can be made negligible. Thus, for a desired bend height h, the length L must be long enough to exceed the L$^2$/h threshold in order to achieve low losses. The actual position of this threshold depends on the waveguide confinement, which is a function of the fabrication conditions. FIG. 3 shows the measured dependence of excess loss on L$^2$/h for a conventional s-bend, with h as a parameter, for the fabrication process used herein. These measurements were taken on z-cut Ti:LiNbO$_3$ waveguides at the 1.55 μm wavelength using the extraordinary (TM) polarization. For L$^2$/h of equal or greater than 150 mm, the excess loss is very small, being less than 0.2 dB. This data also shows that the excess loss is independent of h alone, at least over the region from h equal to 50 to 400 μm.

The dependence of excess bend loss on the maximum angle θ of the bend, with h as a parameter, is shown in FIG. 4 for a conventional s-bend. Although θ does become smaller as L$^2$/h increases, there is no clear-cut dependence on loss with θ for h alone, at least up to θ of 10°. It is believed that the additional loss for a few isolated data points around 1 dB is due to imperfections in the sample edges from the edge cutting process.

The combination of a directional coupler and mirror has been previously used in a proton-exchanged LiNbO$_3$ device, where it was incorporated at the output of a low-speed modulator to enhance system linearity. In that case, the reflective directional coupler served a completely different function than the 180° reflective directional coupler in this invention, in that it was not designed to completely transfer light from one waveguide to the other. Rather, it accepted incoming light from both top and bottom waveguides and was designed to transfer only half the power from the top waveguide to the bottom one after reflection and vice versa, acting more like a conventional y-branch.

OBJECTS AND BRIEF SUMMARY OF THE INVENTION

It is an object of this invention to show that low-loss turns can be achieved in a waveguide with a turn, disposed in a wafer, without sacrificing a great deal of space on the wafer.

Another object of this invention is to interconnect many different devices on or in the same wafer without incurring undue propagation losses.

Another object of this invention is to improve ability to integrate devices on a wafer or increase device density.

Another object of this invention is to increase active length of a waveguide device.

Another object of this invention is the reduction of drive voltage of the electrooptic devices that incorporate this invention wherein reduction of the drive voltage is directly proportional to the number of waveguide passes in the device.

Another object of this invention is the method of making the electrooptic and/or optic devices described herein.

Another object of this invention is the is a method for operating the devices of this invention.

These and other objects of this invention can be attained by an invention that is characterized by reflecting an optical signal in a space on a wafer that is a fraction of the space required by same or similar prior art devices.

BRIEF DESCRIPTION OF THE DRAWINGS

FIG. 1 shows the method for forming a titanium-diffused waveguide in a lithium niobate substrate.

DETAILED DESCRIPTION OF THE INVENTION

This invention pertains to achieving low-loss compact turns of optical signals on a suitable substrate without sacrificing a great deal of space on the substrate and to reducing drive voltage of a device. Low-loss reflective compact turns of optical signals can be used to interconnect different devices on the same wafer, thus improving the ability to integrate devices or increase device density. Furthermore, the low-loss, reflective compact turns can be used within the same device to increase active length thereof.

More specifically, this invention pertains to electrooptical and optical devices characterized by the use of reflective surfaces to redirect an optical signal in order to reduce the amount of space required to turn or re-direct an optical signal. The invention also pertains to methods for making and operating the devices.

The devices of this invention are represented by three embodiments wherein the first is a device characterized by the use of reflective s-bends, the second is a device characterized by the use of reflective directional couplers, and the third is a device characterized by the use of grooves in the wafer filled with a reflective material.

Figure 1A:
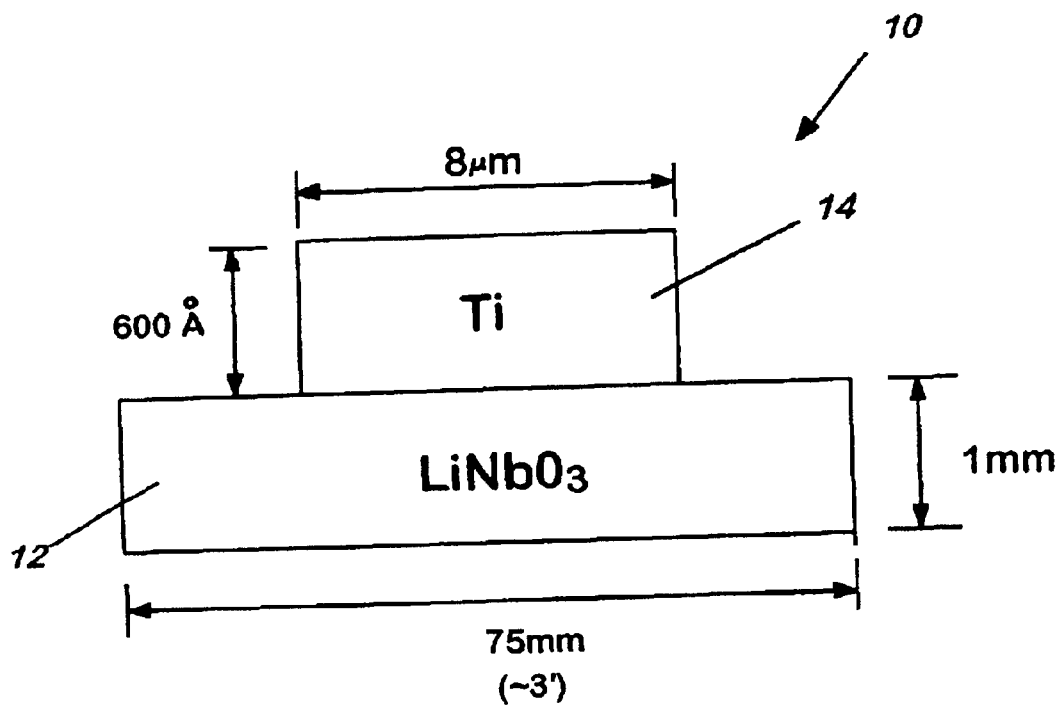
FIG. 1(a) shows the structure with undiffused titanium and FIG. 1(b) shows the titanium diffused into the substrate to form a waveguide.
Figure 1B:
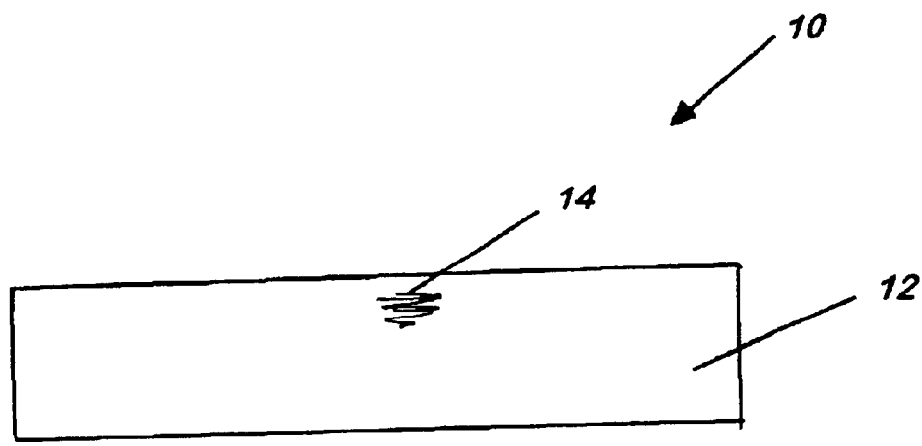
Figure 2:
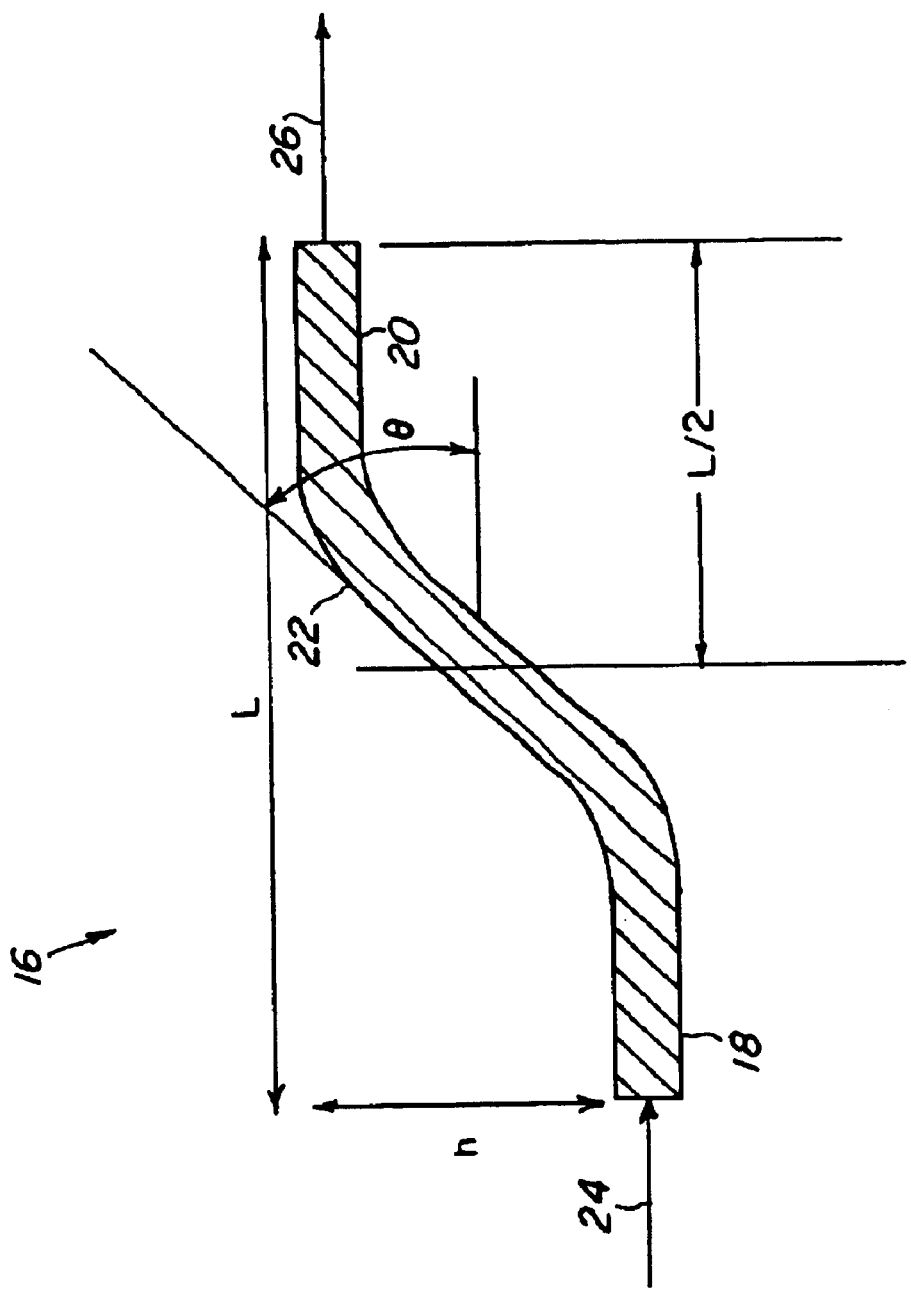
FIG. 2 demonstrates a conventional through s-bend structure with length L, offset height h and maximum bend angle of θ, where h extends in the vertical y plane and L extends in the horizontal x plane.

Before proceeding with description of the invention, reference here is made to FIGS. 1(a) and 1(b) which show a cross-section of a potential waveguide material 10 before diffusion and oxidation of titanium (Ti), FIG. 1(a), and after diffusion of titanium, FIG. 1(b). Waveguide 10 is composed of substrate 12 and conveying medium or waveguide 14. Substrate 12 can be made of any suitable material, including ferroelectric materials such as lithium niobate (LiNbO$_3$), which is typically used with Ti-diffused or proton exchange waveguides; lithium tantalate (LiTaO$_3$), which is typically used with proton exchange waveguides; barium titanate (BaTiO$_3$); strontium barium niobate (SrBaNbO$_3$); various polymers; and semiconductor materials such as indium gallium arsenide phosphide (InGaAsP), indium phosphide (InP), gallium arsenide (GaAs), and gallium aluminum arsenide (GaAlAs). Conveying medium 14 can be any suitable material which has a higher refractive index than the substrate 12 after formation of the waveguide. Since lithium niobate and titanium are premier materials for waveguide structures of this invention, the description that follows will be made in the context of titanium—diffused waveguides in lithium niobate substrates, although it should be understood that other materials can be used.

Figure 5:
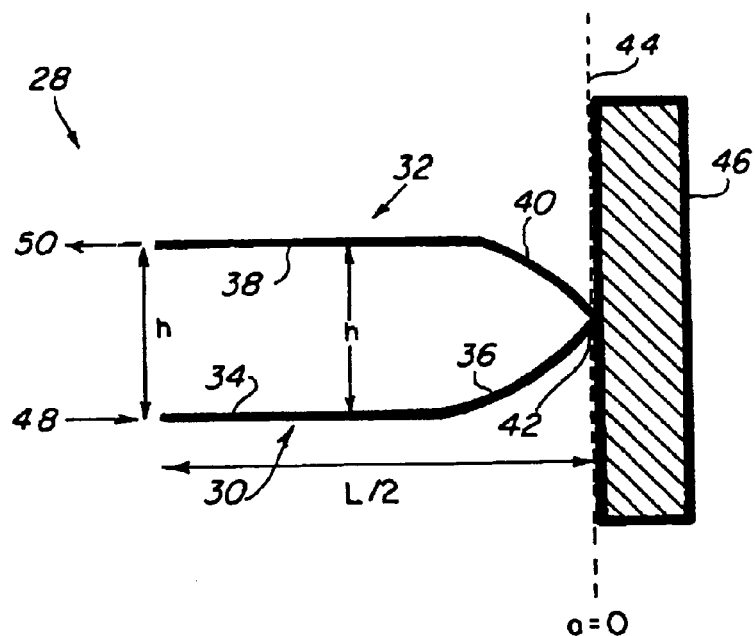
FIG. 5 demonstrates a reflective s-bend scheme for achieving a low-loss turn.

The first embodiment of this invention is shown in FIG. 5 which is a design of the reflective s-bends within the LiNbO$_3$ substrate, not shown, with the portion that winds up on the finished LiNbO$_3$ chip being on the left side of the mirror in the diagram. The structure can be viewed as two identical intersecting s-bends which are bisected by a mirror at their intersection. Alternatively, the portion to the left of the mirror can be viewed as a single s-bend which is flipped horizontally about its midpoint. As shown schematically in FIG. 5, the s-bend structure 28 includes lower waveguide 30 and upper waveguide 32, which are continually bending. The lower waveguide 30 and the corresponding upper waveguide 32 each extend from the left extremity, as viewed in FIG. 5, to apex 42 where the center lines of waveguides 30 and 32 intersect. Apex 42 ideally intersects or is in close proximity to the reflective surface 44 which is a component part of mirror 46.

Figure 3:
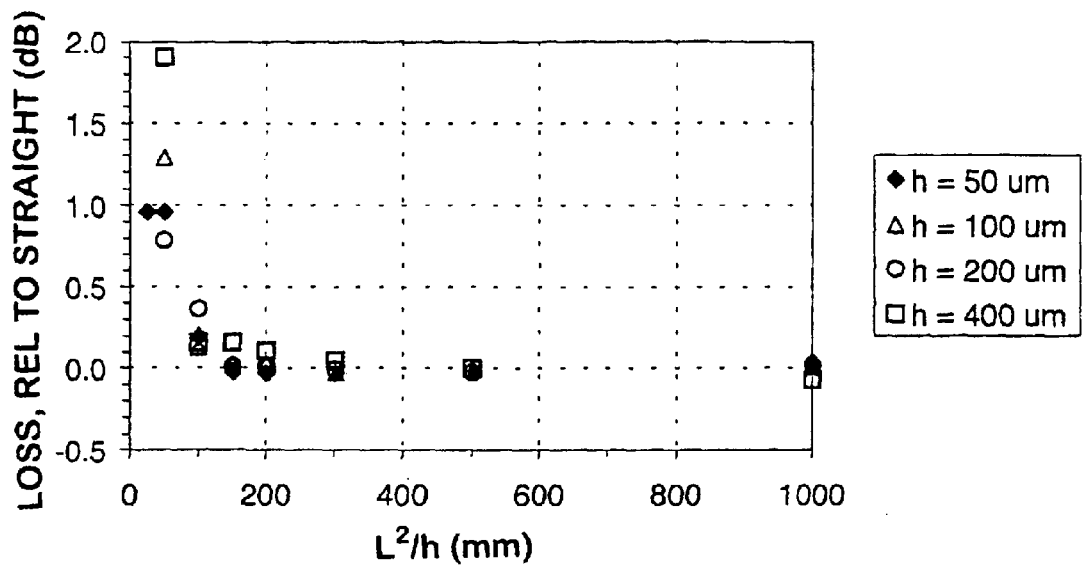
FIG. 3 is a graph showing measured dependence of loss on the parameter $L^2/h$ in connection with prior art s-bends illustrated in FIG. 2.

Reflective surface 44 is disposed on an edge 45 of a substrate which should be polished to a smooth surface before application of the reflective surface. Smoothness of the substrate edge in the vicinity of the waveguides should be about or better than ⅕ of the typical wavelength of 1.5 $\mu$m or about 0.3 $\mu$m. Lower waveguide 30 and upper waveguide 32 meet at the apex 42 in the embodiment shown in FIG. 5. The parameter "a" designates the horizontal distance of the apex 42 from the reflective surface 44. When the apex 42 intersects the edge of the reflective surface 44, the parameter "a" is zero, as it is in FIG. 5. The parameter L/2, with L defined by equation (1), is the horizontal extent of lower and upper waveguides 30, 32 and h is the maximum vertical distance between lower and upper sections 30, 32. Typically, h is 50 to 500 $\mu$m, measured from the center line of waveguides. The distance h should be sufficient to limit coupling via the evanescent wave effect between lower and upper waveguide sections 30, 32. In designing this turn, one would typically choose the desired h and then choose $L^2/h$ equal to or greater than 150 mm to ensure minimal losses in the bends themselves (refer to FIG. 3). For $L^2/h$ of 150 mm, this would give L of 2.7 mm and L/2 of 1.35 mm for h of 50 $\mu$m, and L of 8.7 mm for h of 500 $\mu$m. To prevent light from being reflected back from reflective surface 44 into waveguide 30, the reflective surface 44 is not exactly at 90° to the incoming light. The offset is given by equation (2), referenced to the horizontal, and depends directly on h and L. The offset is given by $\theta$ of equation (2) referenced to the horizontal, and depends directly on h and L. The offset is typically below about 10° for these parameters.

Figure 4:
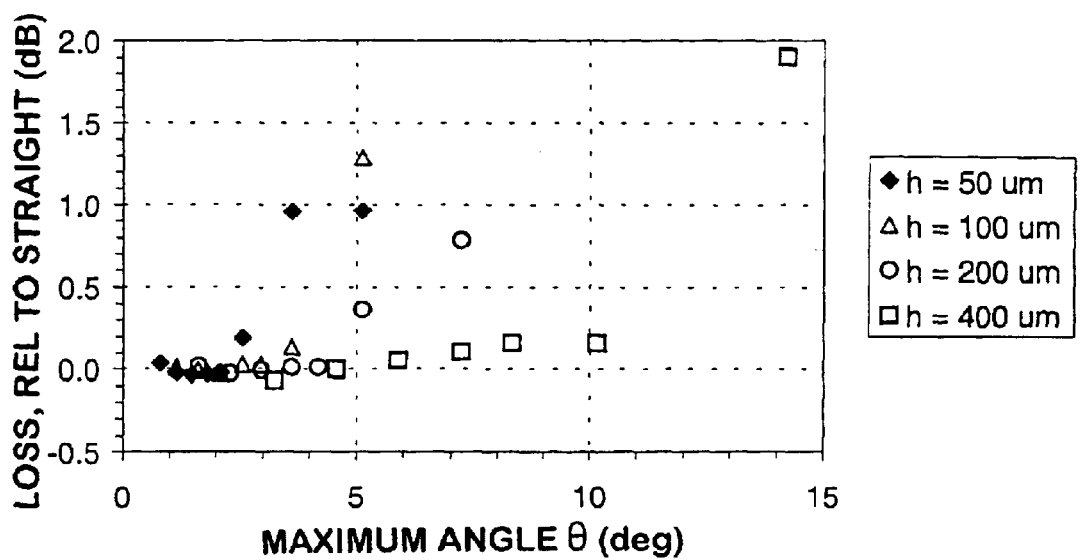
FIG. 4 is a graph showing measured dependence of loss on maximum bend angle θ in connection with prior art s-bends illustrated in FIG. 2.
Figure 6:
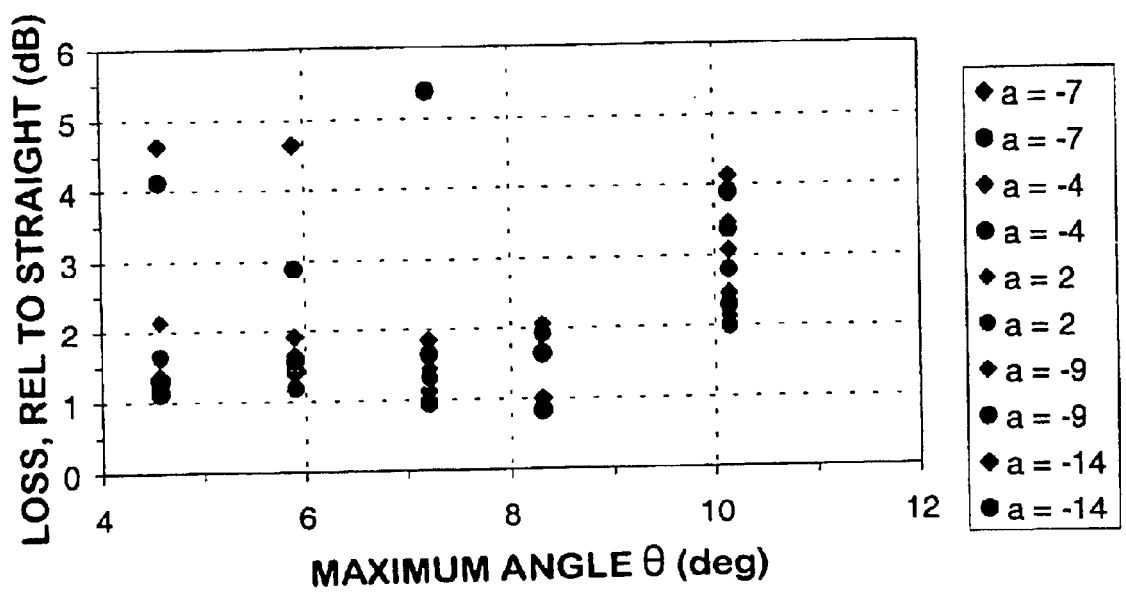
FIG. 6 is a graph showing measured optical loss for reflective s-bend turns relative to a straight channel as a function of the angle θ and the parameter "a" for different reflective s-bend turns on one wafer or chip.
Figure 7:
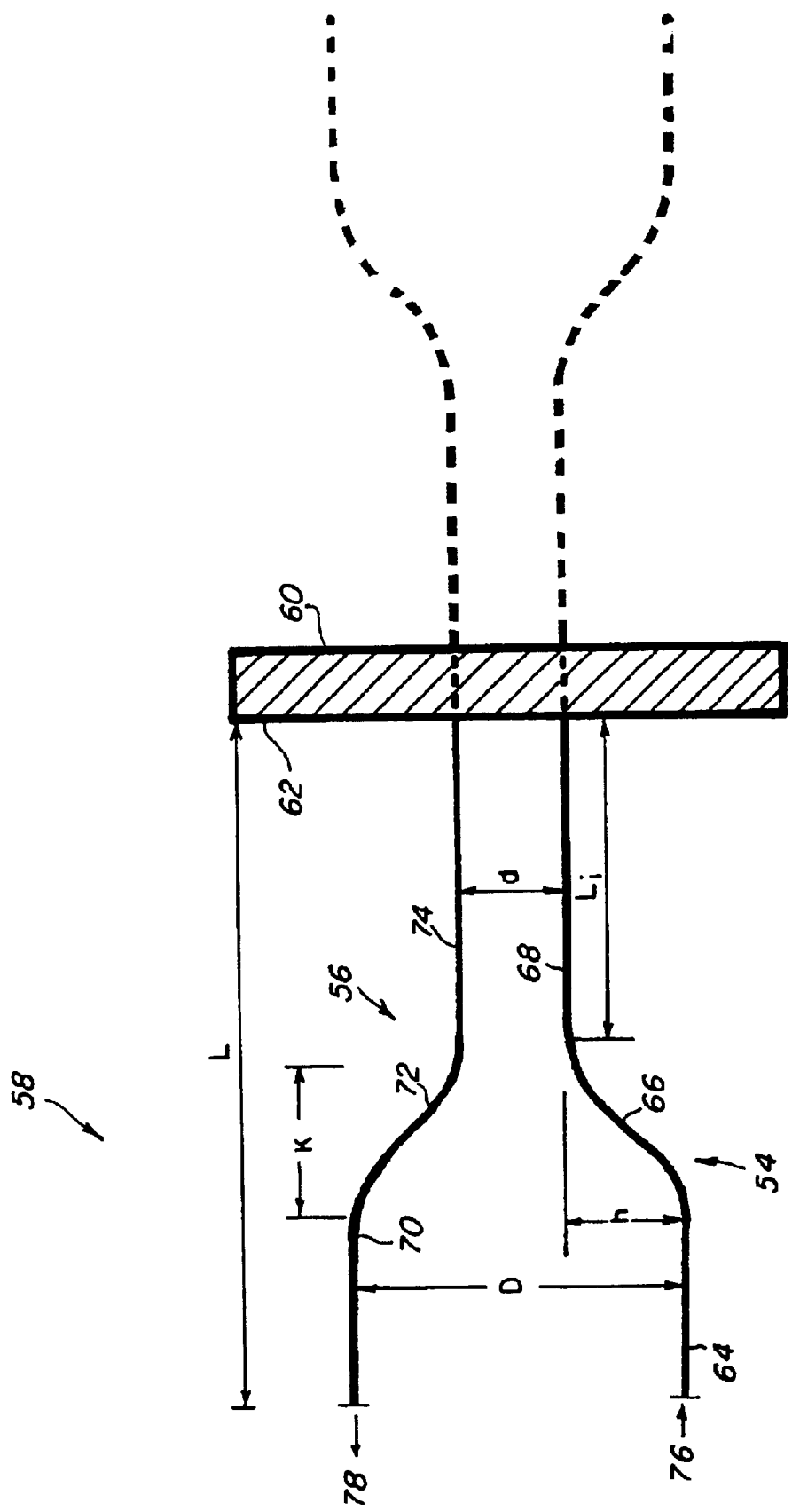
FIG. 7 demonstrates a reflective directional coupler.

The parameters $\theta$ and $L^2/h$ hold for the bends in the embodiment show in FIG. 5 as well as for the transition section to the left of the coupling region in FIG. 7. The bends in FIGS. 5 and 7 are exaggerated in that they appear to form a greater bending angle than in reality, wherein the lower and the upper waveguides are closer to straight channels than what is shown in FIGS. 5 and 7. The bends used in the reflective embodiments of FIGS. 5 and 7, or in any other embodiment, should be kept to a minimum and in conformance with FIGS. 3,4 and 6, in order to keep optical loss therethrough to a minimum.

Input light 48 in the lower arm will propagate along the lower s-bend half and will be reflected by reflective surface 44, proceeding along the upper s-bend half to the output 50. Alternatively, the input and output could be interchanged. In the ideal case, waveguide propagation along the reflective s-bend turn will mimic that of propagation in a single s-bend.

The reflective devices can be measured with a lens coupling setup. The input light is focused onto the waveguide with a lens and the reflected light comes back through the same lens. The separation of the waveguide arms is such that the input and output beams remain adequately separated so the output light can be directed to an external mirror and into a photodetector without interfering with the input beam. The loss of the reflective s-bend is referenced to that of a through straight channel, with a conservative 0.2 dB adjustment made for the external mirror and the extra propagation length of the reflective s-bend.

FIG. 6 shows the experimental loss of the reflective s-bend turns, relative to a straight channel, as a function of $\theta$ and $L^2/h$ for different reflective s-bend turns on one LiNbO$_3$ chip where h was fixed at 400 $\mu$m. The lowest measured loss was 0.6 dB and most of the turns had losses of equal to or less than 2 dB. There is no clear-cut loss dependence on $\theta$ between the values of 3° to 6°, which corresponds to $L^2/h$ of 500 mm to 150 mm. For $\theta$ of 7°, which is equivalent to $L^2/h$ of 100 mm, the loss increases by about 1–3 dB. While up to 0.5 dB of this loss may be due to losses in the bends themselves from fast bending, i.e., small $L^2/h$, see FIG. 3, this suggests that an excessive angle may also contribute to loss. There is also some overall scatter in the data which may be due to sample edge imperfections and variations in mirror quality.

To check the sensitivity of loss on each side of the mirror, placement of the apex on the mask relative to the edge cut lines was varied for a total span of 16 $\mu$m, or about 8 $\mu$m. The position "a" of the apex relative to the mirror/reflective surface for the 16 $\mu$m span does not appear to contribute to loss, which is dominated by other factors. This is encouraging from a fabrication standpoint since it suggests that there is some tolerance in the position of the edge cut for the LiNbO$_3$ substrate.

The loss of the 180° reflective s-bend turn of 0.6 dB is comparable to that of the prior art loss in semicircular bends of less than 1 dB and much lower than the semicircular bend loss of 11 dB in another prior art disclosure. The reflective s-bend turns are much more compact than that of the semicircular turns which had 2.4 cm diameter. The reflective s-bend turns on this mask occupy a space of h=400 $\mu$m in the vertical direction and L/2 in the horizontal direction, with L/2 ranging from 3 mm ($L^2/h$ of 100 mm) to 7 mm ($L^2/h$ of 500 mm). There is a wide range of h and L values that can produce low-loss s-bend turns; the parameters chosen for this test are only examples. In designing the turn, one should choose the desired h and then choose $L^2/h$ of equal to or greater than 150 mm to insure minimal losses in the bends themselves. A turn with h of 50 $\mu$m, for example, would only require a length L/2 of 1.4 mm to satisfy the preliminary design condition of $L^2/h$ of equal to or greater than 150 mm. Although there is no strict requirement on h, large enough h is chosen to separate the input and output waveguides ans to aid in measuring.

In comparing prior art and the first embodiment of this invention in lithium niobate, the most relevant parameters are the optical loss and the lateral offset between input and output waveguides. The prior art loss for a 180° turn was approximately 1 dB with a required radius of curvature R of 1.2 cm, corresponding to a lateral offset of 2R=2.4 cm. The turn can be accomplished with the first embodiment of this invention with a 2–3 order of magnitude reduction in lateral offset between input and output waveguides (h in FIG. 5) while achieving comparable or lower loss.

The second embodiment for low-loss, reflective compact turns in a lithium niobate substrate is a reflective directional coupler, which is shown in FIG. 7. In the ideal case, the response of the reflective directional coupler mimics that of a conventional directional coupler with an interaction length $L_i$, where $L_i$ is the length where the two waveguides are coupled. In a conventional directional coupler, complete power transfer from one waveguide arm to the other waveguide arm occurs when $L_i=L_c$, where $L_c$ is the coupling length which depends on waveguide confinement and on the separation d between the two waveguides. For a 180° turn, it is also desired to achieve complete power transfer from one waveguide arm to the other waveguide arm, but with the return optical power propagating opposite to the incoming power. This can be accomplished by putting a reflective surface/mirror at the halfway point of a full directional coupler.

In FIG. 7, the reflective directional coupler 52 includes lower waveguide 54 and upper waveguide 56 each abutting reflective surface 58 which is a component of mirror 60. The reflective surface can be any highly reflective material, such as a gold film deposited on edge 62 of a lithium niobate substrate, or a dielectric mirror attached to the substrate. This is applicable to embodiment of FIGS. 5 and 7. Lower waveguide 54 includes initial bend section 66 with offset h, which merges with lower coupler section 68, terminal end of which is at the edge of the substrate. Length $L_T$ is the total length of the lower and the upper waveguides 54, 56 and is the sum of s-bend section 66, and lower coupler section 68. Upper waveguide 56 includes initial s-bend section 72 with offset h, which merges with upper coupler section 74, the terminal end of which is at the edge of the substrate. Length L is the horizontal extent of s-bend sections 66, 72. As in the first embodiment, one would typically choose the desired h and then choose $L^2/h$ equal to or greater than 150 mm to ensure minimal losses in the bends themselves. Lower and upper coupler sections 68, 74 are each in horizontal extent $L_i$ which is the interaction length of the coupler and are spaced a distance d from each other. Parameters $L_i$ and d are critical and should be chosen to ideally transfer all optical power from section 68 to section 74 by the evanescent wave phenomena in directional couplers. Parameters $L_i$ and d are chosen together. $L_i$ is generally 1–5 mm and d is generally 2–10 µm; $L_i$ of 2 mm and d of 5 µm is one possible combination. Lower and upper s-bend sections 66, 72 are spaced a sufficient distance D from each other to prevent coupling or transfer of optical waves between the sections at the input and output, where D is the sum of 2 h and d. Otherwise D is not constrained and could be as small as, for example, 25 µm. In practice, a small amount of coupling may occur as the two s-bends approach each other, and this needs to be factored into the overall design or choice of $L_i$ and d. For the purpose of comparison, the parameter D in this embodiment is analogous to 2R for prior art, which is the lateral offset between input and output waveguides in both cases. This embodiment offers a 3 order of magnitude reduction in lateral offset compared with prior art.

Figure 8:
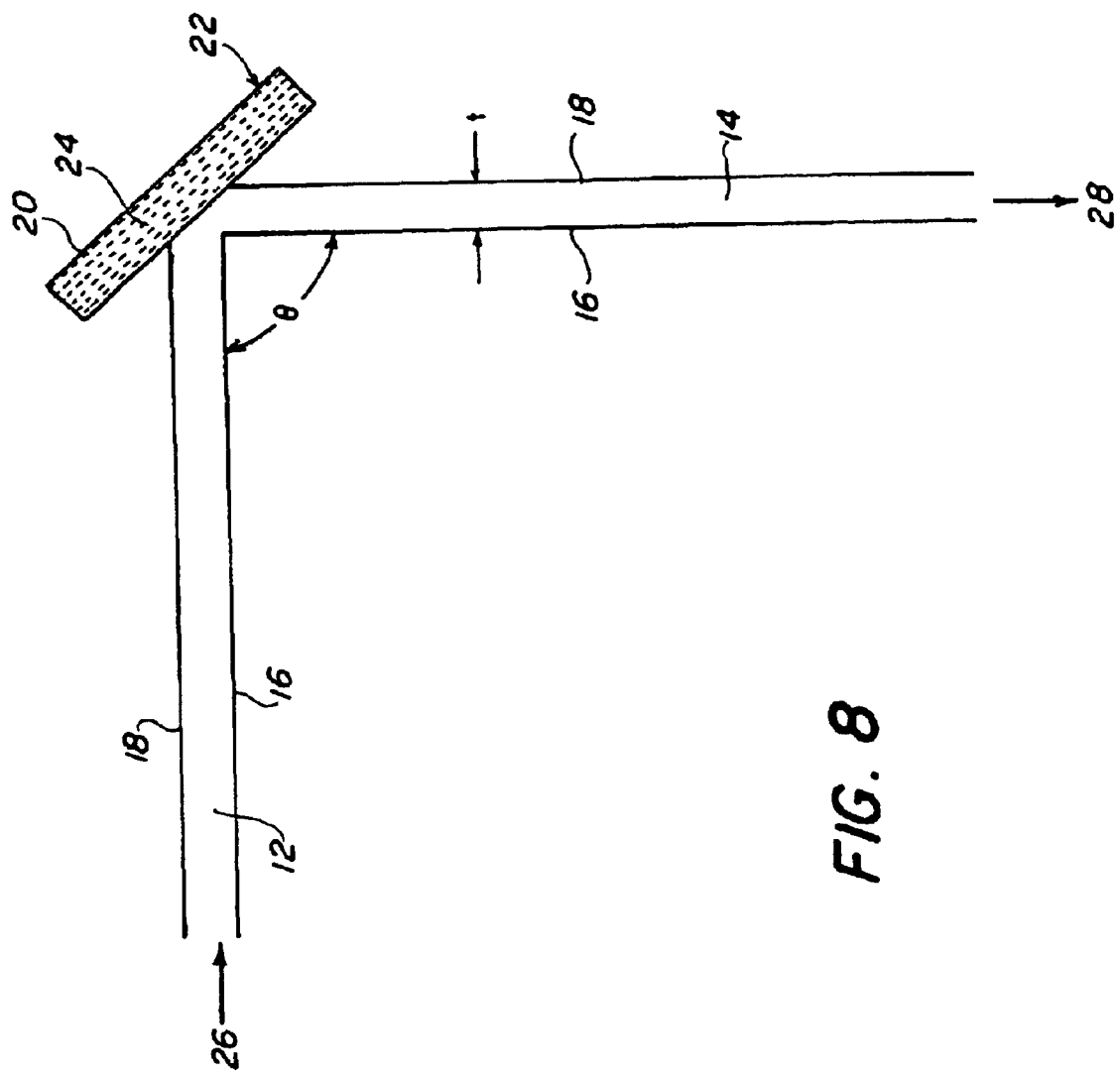
FIG. 8 is a top view of a turning reflective waveguide with an etched groove filled with a reflective material.

The third embodiment for achieving compact turns in waveguides is shown in FIG. 8. In this configuration, turning is achieved by fabricating mirrors inside the substrate itself. The mirrors are formed by ion beam etching and then filling the etched region with a highly reflective material, such as gold, or by a material and angle selection to produce total or partial internal reflection. More specifically, FIG. 8 shows a reflective turn structure which includes a pair of waveguides 12, 14 with waveguide 12 being the upper channel or straight section connected at right angle θ' to the side waveguide 14. Each waveguide 12, 14 is W in width defined by lines 16, 18. The waveguides are diffused into a substrate, as in FIG. 1. In the top right hand corner of FIG. 8 is mirror 20 that is a groove 22 in the substrate filled with a reflecting material 24. Groove 22 intersects waveguide corner formed where upper waveguide 12 is connected to side waveguide 14 so that waveguide line 16 is displaced from groove 22 whereas waveguide line 18 is cut-off the corner by groove 22 so the groove partially intersects waveguides 12, 14. In order to achieve low losses, the etch depth should be deep enough to accommodate the entire field of the optical mode, i.e., input signal 26. The mode field depth is about 4 µm for a Ti:LiNbO$_3$ waveguide at the 1.55 µm waveguide length and most of the power is contained in a 10 µm depth. Thus, the mirror etch depth should be at least as great as the optical mode. The width of the etched region is not critical as long as it is wide enough to allow it to be filled with a reflective material. The length of the etched region is also not critical provided that, like the depth, it is long enough to contain the entire mode width. Length of groove 22 can be 15 µm but from a fabrication standpoint, much longer, such as several millimeters etch regions, can produce more uniform etch results.

As shown in FIG. 8, mirror 20 is placed at 45°, or at any other angle, relative to the incoming optical input so that a 90° turn, or any other turn, is achieved by each reflection. Thus, a single mirror can be used to change the propagating direction from one crystal axis to another, and two perpendicular mirrors can produce a full 180° turn.

Figure 9:
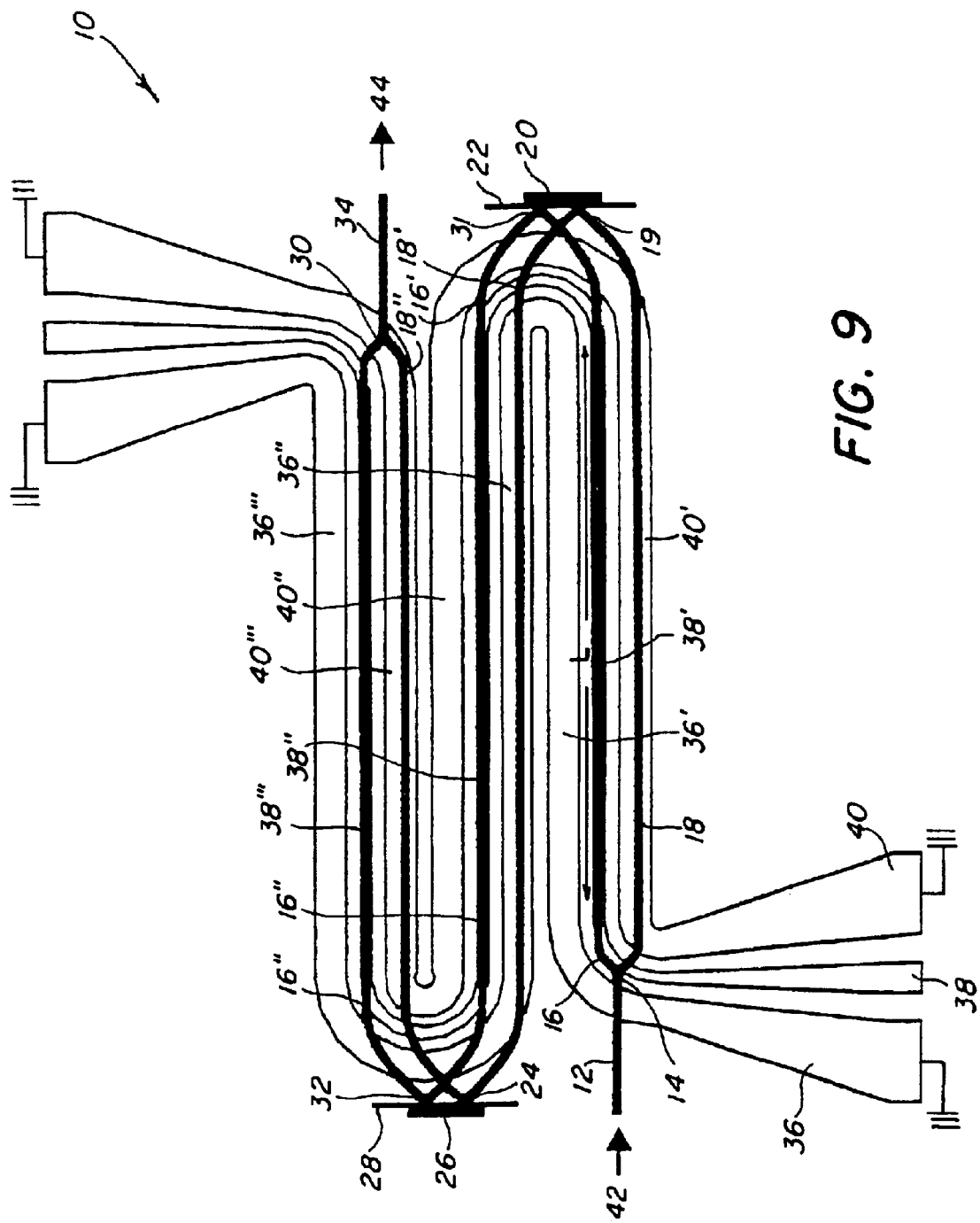
FIG. 9 is a schematic representation of a traveling-wave serpentine 3-pass modulator with two reflective surfaces.
Figure 10:
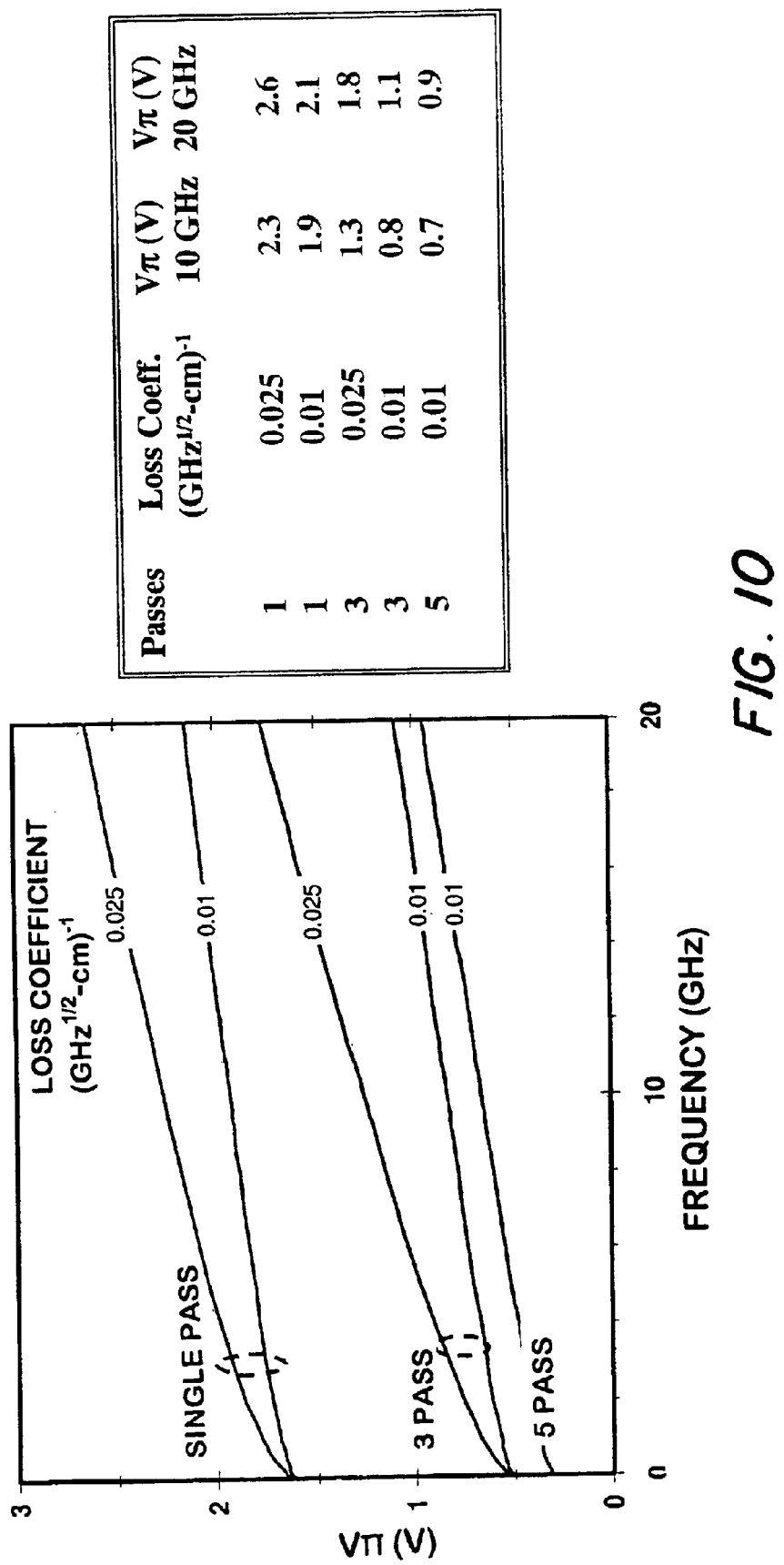
FIG. 10 is a graph showing calculated dependence of drive voltage ($V_\pi$) on frequency for a traveling-wave prior art single-pass, 3-pass and 5-pass modulator, with electrode loss coefficient as a parameter, on a four-inch LiNbO$_3$ wafer.

FIG. 9 is a schematic depiction of a traveling-wave, 3-pass reflective serpentine modulator of this invention which uses 180° turns to increase its interaction or active length ($L_a$), which is the total length of the waveguides covered by the hot electrode, and thus reduce the required drive voltage, as shown in the graph of FIG. 10. FIG. 9 shows a coplanar waveguide structure for the electrode configuration which provides modulation through the desired electrooptic effect and leads to low power and drive voltage requirements. The top view of the interferometric modulator in FIG. 9, denoted generally as 10, is shown disposed on a substrate, not shown, with a horizontal inlet optical waveguide 12 being split at junction 14 into upper and lower optical waveguides 16, 18 which waveguides are functionally connected to or extend to point 19 disposed on reflective surface 20, which typically is a gold/copper layers deposited on edge 22 of the substrate. Optical waveguide 18' is spaced above waveguides 16, 18 and extends to the left, as viewed in FIG. 9, generally parallel to waveguides 16, 18 from point 19 on reflective surface 20 across the substrate to point 24 on reflective surface 26 disposed on edge 28 of the substrate. Point 24 is disposed opposite point 19 across the substrate but is disposed above point 19. Waveguide 18'' is spaced above waveguide 18' and extends to the right, as viewed in FIG. 9, generally parallel to waveguide 18' from point 24 on reflective surface 26 across the substrate to junction 30. Waveguides 18, 18' and 18'' are continuous sections of the same waveguide. Waveguide 16 extends from junction 14 to the right across the substrate to point 31 disposed on reflective surface 20. Both points 19 and 31 are disposed on the same reflective surface 20 but point 31 is disposed above point 19. It should be understood that points 19, 31 can be disposed on separate reflective surfaces which need not be in the same vertical plane. From point 31, waveguide 16' extends to the left on and within the substrate, spaced above waveguide 18', to point 32 disposed on reflective surface 26. Point 32 is disposed on the same reflective surface as point 24 but point 32 is disposed above point 24. It should be understood that points 24, 32 can be disposed on separate reflective surfaces which need not be in the same vertical plane. From point 32, waveguide 16'' extends to the right and across the substrate, spaced above waveguide 18'', to junction 30 where it merges with waveguide 18'' to form exit waveguide 34. Waveguides 16, 16' and 16'' are continuous sections of the same waveguide. A continuous path is provided for an optical signal through junctions 14, 30 and points 19, 31, 24 and 32.

Active length $L_a$ generally extends from one extremity of a waveguide to the opposite end in the long regions where both waveguide and electrodes are straight, as shown in FIG. 9, in a serpentine fashion. In a 3-pass modulator, its active length approximately triples. This is a desirable attribute since it results in a 3 fold reduction in drive voltage ($V_\pi$) at dc, relative to a single-pass modulator of prior art. In general, the reduction in dc $V_\pi$ is inversely proportional to number of passes N and the reduction in power required is inversely proportional to $N^2$. Additionally, the traveling wave serpentine electrodes enable device operation to tens of GHz.

The electrodes are disposed on the substrate and in designated sections, they are disposed directly over the optical waveguides to afford control and enhancement of optical signal propagation through the waveguides. The purpose of the electrodes is to modulate light by inducing a refractive index change in a waveguide by the electrooptic effect.

Before the electrodes are deposited on the substrate, the substrate surface is overcoated with a buffer layer which is typically a very thin, transparent layer of silicon dioxide ($SiO_2$). A thickness of the silicon dioxide layer is selected to obtain good high-frequency microwave characteristics and to minimize unwanted optical absorption by the overlaying electrodes. The buffer layer is typically about 0.9 μm but can be thinner or thicker and of any other suitable material.

As shown in FIG. 9, outside or upper ground electrode 36 is spaced from central or hot electrode 38 which, in turn, is spaced from the inner or lower ground electrode 40. A source of variable voltage is connected to electrode 38 to afford control of modulator 10. The three electrodes extend over the substrate in a spaced, parallel, serpentine fashion, with some extending over the waveguide sections and others extending over the substrate. As shown in FIG. 9, electrode 40 initially extends upwardly, takes a 90° right turn and extends over waveguide 18 over its active length $L_a$, then through a semicircular turn so that it is disposed over the waveguides 18, 16, 18', 16' in the vicinity of points 19 and 31 with its horizontal section 40' disposed across the substrate and over waveguide 18 over its active length $L_a$, then through another semicircular turn in the vicinity of points 24,32 so that its horizontal section 40" is disposed over the substrate, then with its horizontal section 40''' disposed over waveguide 16", it exits beyond junction 30 in a terminal vertical section which goes through a 90° turn. Electrodes 36 and 38 follow the serpentine path of electrode 40 with horizontal section 36' of electrode 36 disposed over the substrate devoid of any waveguide, its horizontal section 36" disposed over waveguide 18', and its section 36" disposed over the substrate. Horizontal section 38' of electrode 38 is disposed over waveguide 16, electrode section 38" is disposed over waveguide 16' and section 38''' is disposed over waveguide 16". Electrode 38 also ends in a terminal vertical section which goes through a 90° turn before it exits. Outer electrodes are grounded at both ends. The hot electrode, such as electrode 38, provides much more light modulation than a ground electrode because the width of the hot electrode more closely matches that of the waveguide, providing better overlap between the optical and electrical modes.

The device also includes an input optical signal that enters modulator 10 at 42, is split evenly at junction 14 into two optical signals which travel independently through the waveguides 16, 18 of the 3-pass modulator 10 until the signals are merged at junction 30 into a composite signal which exits at 44. The optical signal in the input waveguide is typically single mode since multi-mode signals are unstable in this type of device.

The proposed benefit of incorporating turns into a traveling wave modulator is shown in FIG. 10, which is a graph of drive voltage $V_\pi$ vs. frequency for 1.55 μm light for a single pass, 3-pass, and 5-pass modulator on a 4-inch diameter lithium niobate substrate, with electrode loss coefficient as an additional parameter. For a prior art single-pass device with no reflective turns, results correspond approximately to the top curve with electrical loss coefficient of 0.025 $(GHz^{1/2}\text{-cm})^{-1}$, with modeled $V_\pi$ of about 1.6 volts at dc and 2.6 volts at 20 GHz. Increasing the interaction length to 3-pass or greater, reduces dc drive voltage to around 0.5 volt or less. Broadband operation for such a long structure requires a low electrode loss coefficient; the current value of 0.025 $(GHz^{1/2}\text{-cm})^{-1}$ has evolved by using carefully designed thick electrodes. With 0.025 $(GHz^{1/2}\text{-cm})^{-1}$ loss coefficient or lower, drive voltages of less than 1.8 volts are projected for the 3- or more-pass configuration up to a frequency of 20 GHz. By improving the loss coefficient to 0.01 $(GHz^{1/2}\text{-cm})^{-1}$, one can obtain less than 1 volt drive voltage for a 5-pass modulator operating at 20 GHz. This model assumes that the optical and microwave signals are velocity-matched in order to obtain high frequency operation, this can be achieved through proper design of electrode dimensions using computer models.

It should be understood that the low-loss reflective compact turns can be made in a lithium niobate substrate or in any other suitable substrate, which requires significantly less space than for conventional semicircular or partially circular turns in the manner described and illustrated herein. The advantage of increased device density is realized by being able to provide a 180° turn, on a lithium niobate substrate using titanium-diffused pathways with a loss of about 1.0 dB or less, preferably about 0.6 dB or less, in a space that is at least ⅕, preferably at least ⅕₀ the space of the same or similar prior art turn. These reflective compact turns improve the ability to interconnect different devices on the same chip and to increase device density. They can also be incorporated into a modulator, or another electrooptic and/or optical device, to increase the active length. More specifically, low-loss reflective compact turns can be made using an s-bend or a directional coupler and placing a reflecting surface at the midpoint of the structure to change direction of the optical signal. As described, the compact turns can also be made by using ion beam etching to etch grooves in the substrate and then filling the grooves with a fully or partially reflective material. A traveling-wave serpentine modulator can be implemented using 180° turns. Such a modulator can use the reflective, low-loss, compact turns to reduce drive voltage in inverse proportion to the number of passes. The drive voltages of electrooptic devices of this invention are a fraction of the same or similar prior art devices, being less than about ½, preferably less than ⅕, and drive power decreases even more, being proportional to $V^2$. High frequency operation of electrooptic devices of this invention can be maintained using traveling-wave electrodes with very low losses.

Having described the invention, the following example is given as a particular embodiment thereof and to demonstrate the practice and advantages thereof. It is understood that the example is given by way of illustration and is not intended to limit the specification of the claims in any manner.

EXAMPLE

Fabrication and operation of a traveling-wave serpentine modulator, of the type shown in FIG. 9, is set forth below for operation at a light wavelength of 1.55 μm. Its horizontal extent is 6 cm and its vertical extent is 3 mm.

Wafer selection is made by selecting an optical-grade commercial lithium niobate ($LiNbO_3$) wafer which is cut along its z plane. The z plane is the crystal axis that is perpendicular to the largest face of the crystal. The wafer diameter is 3 inches and its thickness is 1 mm. The wafer is cleaned in trichloroethylene, acetone, methanol, detergent, and deionized water. Titanium is sputtered at room temperature over the −z face to a thickness of 600 Å. The optical waveguides are defined on the substrate by photolithography by spin-coating photoresist on the substrate, prebaking the photoresist at 90° C. for 25 minutes, exposing the photoresist to UV light through the Waveguide Photomask (see FIG. 9), with the waveguides aligned along the y-axis of the substrate. The photoresist is then developed to eliminate it, and postbaked at 110° C. for 45 minutes to fully harden it in the regions where titanium is ultimately desired, i.e., the waveguide regions. Finally, the titanium, which is uncovered by the photoresist, is etched away by the use of ethylene diamine tetraacetic acid (EDTA). The final titanium strip width after etching is 8 μm and produces single-mode waveguides after indiffusion of titanium. The substrate is then placed in a furnace and heated to an elevated temperature of 1000° C. for 10 hours in wet oxygen.

A protective mask is made for subsequent ion beam etching by sputtering a 600 Å-thick layer of titanium and covering it with a 7 μm-thick layer of photoresist. The etch region is defined by photolithography, the photoresist is prebaked at 110° C. for 2 hours, the photoresist is exposed by uv light through Etch Photomask, the photoresist is developed in the desired regions to facilitate its elimination, and the photoresist is postbaked at 90° C. for 12 hours to fully harden it in the regions where it serves as a protective layer. The titanium uncovered by the photoresist is etched in EDTA.

In reference to ion beam etching, which is required for impedance matched devices, a wafer is placed in an ion beam etching system and a groove is etched in the wafer to a depth of 4 μm to form etched regions adjacent to the waveguides in the active regions of the device. Protective photoresist and titanium are removed from the surface of the wafer.

A 0.9 μm thick layer of silicon dioxide ($SiO_2$) is then deposited over the entire wafer surface by sputtering. The silicon dioxide layer is annealed by placing the coated wafer in a furnace at 500° C. for 5 hours in wet oxygen. The annealing step improves thermal stability of the device.

Electrode plating base deposition includes depositing a sandwich layer of titanium/gold/titanium having thickness of 200 Å/1200 Å/200 Å using electron beam evaporation. This serves as the plating base for the thick electrodes which are plated later.

For electrode photolithography, a thick photoreist mold is defined for plating the electrodes using thick-resist photolithography. The thickness of the photoresist mold should be at least as thick as the desired gold electrode thickness. For this mask design with a 25 μm gap between the electrodes, the electrode thickness is 21 μm for ion-beam etched modulators. This thickness was chosen to achieve high frequency operation of the device, which necessitates matching the velocities of the optical and microwave signals by careful geometric design. To form a thick resist mold, three coats of resist are spun, prebaked at 90° C. for 3 minutes after the first two coats and at 110° C. for 3 hours after the third coat. The photoresist is then exposed to uv light through the Electrode Photomask (see FIG. 9), developed to remove unexposed regions, and postbaked at 110° C. for 18 hours to fully harden it. The electrodes are plated later in the regions where there is no photoresist on the wafer.

Electroplating of the electrodes is accomplished using a Pur-A-Gold plating solution at 51° C. to obtain the desired plating thickness of 21 μm. The typical plating rate is about 0.2 μm/minute. Unwanted gold and the photoresist mold are removed using gold etchant for 1 minute.

Wafer dicing is done by dicing the substrate into separate chips along the cut lines which are on the wafer and which are set by the electrode photolithography step. The substrate ends are polished to allow optical input and output coupling and edges 22, 28 are also polished to provide for reflective surfaces 20, 26.

Reflective surfaces on substrate edges are provided by e-beam evaporation. Gold and copper are good reflectors of 1.55 μm light and copper forms an oxide which helps in bonding gold to the lithium niobate substrate. The layers are 100 Å for the copper adhesion layer and 2500 Å gold for the bulk of the mirror. The copper/gold structure yields moderate adhesion and very good reflectance.

The device is operated by aligning an input optical polarization maintaining fiber to the input waveguide of the modulator to achieve good coupling. The input polarization is aligned parallel to the z-axis of the lithium niobate in order to maximize electrooptic response. The input optical signal is at the 1.55 μm wavelength and typically is about 1–10 mW for testing although up to 50 mW or higher should be allowable without the onset of undesirable effects, such as the photorefractive effect. The output optical power is detected by focusing or coupling the light to a high-speed photodetector. An electrical signal with frequencies ranging from dc to 40 GHz is applied to the end of the electrode nearest the optical signal input. The other end of the electrode is terminated with a 50 Ω load. Under normal testing conditions, only a small fraction (perhaps 1/10) of the drive voltage $V_\pi$ needs to be applied to examine the device response using a network analyzer. In a digital operational mode, the full $V_\pi$ should be applied to achieve on-off modulation. For a prior art single-pass device, this is about 2–6 volts up to 40 GHz for an active length of 4.5 cm on a 3-inch wafer. The 3-pass modulator in a 4-inch wafer has and active length design of 24 cm and will yield a reduction in drive voltage which is inversely proportional to the active length; i.e., a reduction of about 5 (24 divided by 4.5).

While presently preferred embodiments have been shown of the electrooptical and optical devices and method for their fabrication and operation, persons skilled in this art will readily appreciate that various additional changes and modifications can be made without departing from the spirit of the invention as defined and differentiated by the following claims.

What is claimed is:

1. A device for turning an optical signal comprising:
   a substrate supporting an input optical pathway and an output optical pathway for guiding an optical signal; and
   a reflective surface for reflecting the optical signal from said input optical pathway to said output optical pathway;
   wherein said input optical pathway and said output optical pathway each comprise a continuously varying angle whose maximum corresponds to a pathway location sufficiently proximate to said reflective surface to reflect at least a portion of the optical signal from said input optical pathway to said output optical pathway;
   and wherein an angle between said input optical pathway and said optical pathway at said reflective surface is less than 20 degrees.

2. The device according to claim 1, wherein said substrate comprises at least one of lithium niobate, lithium tantalate, barium titanate, strontium barium niobate, a polymer, indium gallium arsenide phosphide, indium phosphide, gallium arsenide, and gallium aluminum arsenide, and wherein said input optical pathway and said output optical pathway compose at least one of titanium-diffused pathways and proton exchange waveguides.

3. The device according to claim 1, wherein said reflective surface comprises one of a gold film and a dielectric mirror.

4. The device according to claim 1, wherein said input optical pathway comprises a first midline and said output optical pathway comprises a second midline, said reflective surface being normal to said first midline and to said second midline.

5. The device according to claim 1, wherein said substrate has an edge, and said reflective surface comprises a reflective material on the edge of said substrate.

6. The device according to claim 1, wherein said substrate defines a groove, said reflective surface comprising a reflective material in said groove.

7. The device according to claim 6, wherein said groove is oriented less than 90 degrees to said input optical pathway.

8. The device according to claim 7, wherein said input optical pathway connected to said output optical pathway via junction, said groove located at said junction, wherein said output optical pathway is oriented 90 degrees to said input optical pathway.

9. The device according to claim 8, wherein said substrate comprises at least one of lithium niobate, lithium tantalate, barium titanate, strontium barium niobate, a polymer, indium gallium arsenide phosphide, indium phosphide, gallium arsenide, and gallium aluminum arsenide.

10. A device for turning an optical signal comprising:
a substrate supporting an input optical pathway and an output optical pathway for guiding an optical signal; and
a reflective surface for reflecting the optical signal from said input optical pathway to said input optical pathway:
wherein said input optical pathway comprises a first continuously varying angle having a first minimum, said input optical pathway comprising a first linear section at said first minimum, said output optical pathway comprises a second continuously varying angle having a second minimum, said output optical pathway comprising a first linear section at said second minimum, said first linear section and said second linear section being parallel and of an interaction length sufficient to transfer at least a portion of the optical signal from said first linear section to said second linear section by an evanescent wave phenomena, and
wherein said first continuously varying angle has a first maximum, said second continuously varying angle has a second maximum, a sum of said first maximum and said second maximum being less than 20 degrees.

11. The device according to claim 10, wherein at least one of a distance between said first linear section and said second linear section is between 2 and 10 μm, and the interaction length is between 1 and 5 mm.

12. A device for turning an optical signal comprising:
a substrate supporting a first optical pathway and a second optical pathway for guiding an input optical signal; and
a first reflective surface for reflecting the optical signal from said first optical pathway to said second optical pathway, wherein said first optical pathway and said second optical pathway each comprise a continuously varying angle whose maximum corresponds to a pathway location sufficiently proximate to said first reflective surface to reflect at least a first portion of input optical signal from said first optical pathway to said second optical pathway; and
a hot electrode inducing a refractive index change in said first optical pathway said second optical pathway.

13. The device according to claim 12, wherein said substrate further supports a third optical pathway,
the device further comprising:
a second reflective surface for reflecting at least a second portion of the input optical signal from said second optical pathway to said third optical pathway,
wherein said hot electrode induces a refractive index change in said third optical pathway.

14. The device according to claim 12, wherein said substrate further supports an inlet optical pathway connected to said first optical pathway and a fourth optical pathway via a junction, the input optical signal being split into a first optical signal traveling through said first optical pathway and a second optical signal traveling through said fourth optical pathway.

15. The device according to claim 12, further comprising:
a ground electrode parallel to said hot electrode for at least a portion of said hot electrode; and
a buffer layer between said substrate, and said hot electrode and said ground electrode.

16. The device according to claim 15, wherein said substrate comprises at least one of lithium niobate, lithium tantalate, barium titanate, strontium barium niobate, a polymer indium gallium arsenide phosphide, indium phosphide, gallium arsenide, and gallium aluminum arsenide, and
wherein said input optical pathway and said output optical pathway comprise at least one titanium-diffused pathways and proton exchange waveguides.

17. A method for making a device for turning an optical signal comprising:
providing an input optical pathway and an output optical pathway for guiding optical signal on a substrate; and
providing a reflective surface to reflect the optical signal from said input optical pathway to said output optical pathway,
wherein said input optical pathway and said output optical pathway each comprise a continuously varying angle whose maximum corresponds to a pathway location sufficiently proximate to the reflective surface to reflect at cast a portion of the optical signal from the input optical pathway to the output optical pathway, and
wherein an angle between said input optical pathway and said output optical pathway at said reflective surface is less than 20 degrees.

18. The method according to claim 17, wherein said step of providing a reflective surface comprises:
etching a groove in the substrate; and
filling the groove with a reflective material.

19. The method according to claim 18, further comprising:
connecting the input optical pathway and the output optical pathways via junction; and
providing the reflective material at the junction.

20. A method for making a device for turning an optical signal comprising:
providing a substrate supporting an input optical pathway and an output optical pathway for guiding an optical signal; and
providing a reflective surface for reflecting the optical signal from the input optical pathway to the input optical pathway;
wherein the input optical pathway comprises a first continuously varying angle having a first minimum, the input optical pathway comprising a first linear section at the first minimum, the output optical pathway comprises a second continuously varying angle having a second minimum, the output optical pathway comprising a first linear section at the second minimum, the first linear section and the second linear section being parallel and of an interaction length sufficient to transfer at least a portion of the optical signal from the first linear section to the second linear section by an evanescent wave phenomena, and wherein the first continuously varying angle has a first maximum, the second continuously varying angle having a second maximum, a sum of the first maximum a the second maximum being less than 20 degrees.

21. The method according to claim 20, wherein at least one of a distance between the first linear section and the second linear section is between 2 and 10 $\mu$m, and the interaction length is between 1 and 10 mm.

22. A method for making a device for turning an optical signal, said method comprising:

providing a substrate supporting a first optical pathway and a second optical pathway for guiding a first optical signal;

providing a first reflective surface for reflecting the first optical signal from the first optical pathway to the second optical pathway, wherein the first optical pathway and the second optical pathway each comprise a continuously varying angle whose maximum corresponds to a pathway location sufficiently proximate to the first reflective surface to reflect the first optical signal from the first optical pathway to the second optical pathway; and providing a hot electrode to induce a refractive index change in the first optical pathway and the second optical pathway.

23. The method according to claim 22, wherein the substrate further supports a third optical pathway, and wherein said providing a hot electrode step further comprises providing the hot electrode to induce a refractive index change in the third optical pathway, the method further comprising:

providing a second reflective surface for reflecting the first optical signal from the second optical pathway to the third optical pathway.

24. The method according to claim 23, wherein the substrate further supports an inlet optical pathway connected to the first optical pathway and a fourth optical pathway via a junction such that an input optical signal is split into the first optical signal traveling through the first optical pathway and a second optical signal traveling through the fourth optical pathway.

25. The method according to claim 24, wherein the first reflective surface reflects the second optical signal from the fourth optical pathway to a fifth optical pathway, the second reflective surface reflecting the second optical signal from the fifth optical pathway to a sixth optical pathway.

26. The method according to claim 25, wherein the substrate further supports an outlet optical pathway connected to the third optical pathway and the sixth optical pathway via a junction.

27. The method according to claim 24 further comprising:

providing a first ground electrode over a portion of the fourth optical pathway, a portion of the first ground electrode being parallel to a portion of the hot electrode.

28. The method according to claim 25, further comprising:

providing a second ground electrode over a portion of the fifth optical pathway, a portion of the second ground electrode being parallel so the on of the hot electrode and the portion of the first ground electrode.

29. The method according to claim 22, wherein said substrate comprises at least one of lithium niobate, lithium tantalate, barium titanate, strontium barium niobate, a polymer, indium gallium arsenide phosphide, indium phosphide, gallium arsenide, and gallium aluminum arsenide, and wherein said input optical pathway and said output optical pathway comprise at least one of titanium-diffused pathways and proton exchange waveguides.

30. The method according so claim 22, wherein the first reflective surface comprises at least one of copper and gold.

* * * * *